April 12, 1960
J. W. DICKENS
2,932,113
FISH LURE
Filed March 16, 1956
2 Sheets-Sheet 1
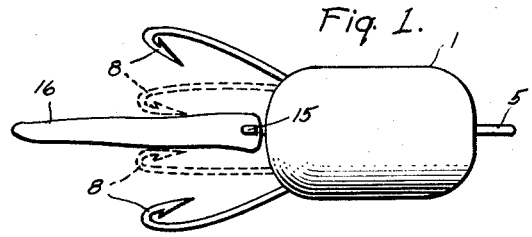
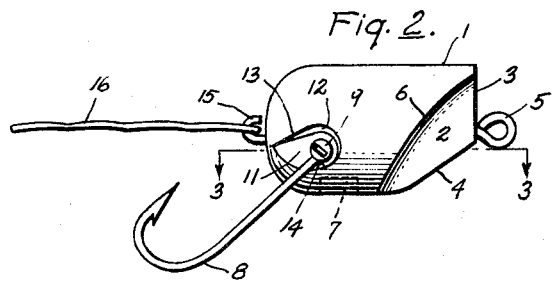
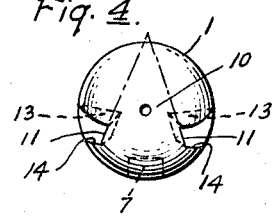
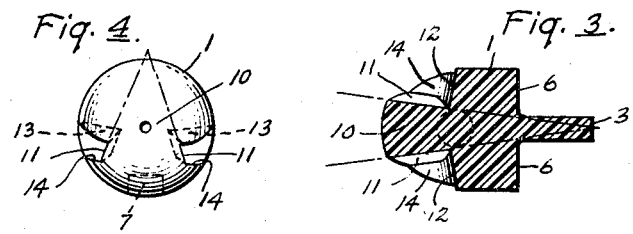
Inventor:
John W. Dickens,
by Charles J. Penfold
His Attorney.

April 12, 1960     J. W. DICKENS     2,932,113
FISH LURE
Filed March 16, 1956     2 Sheets-Sheet 2
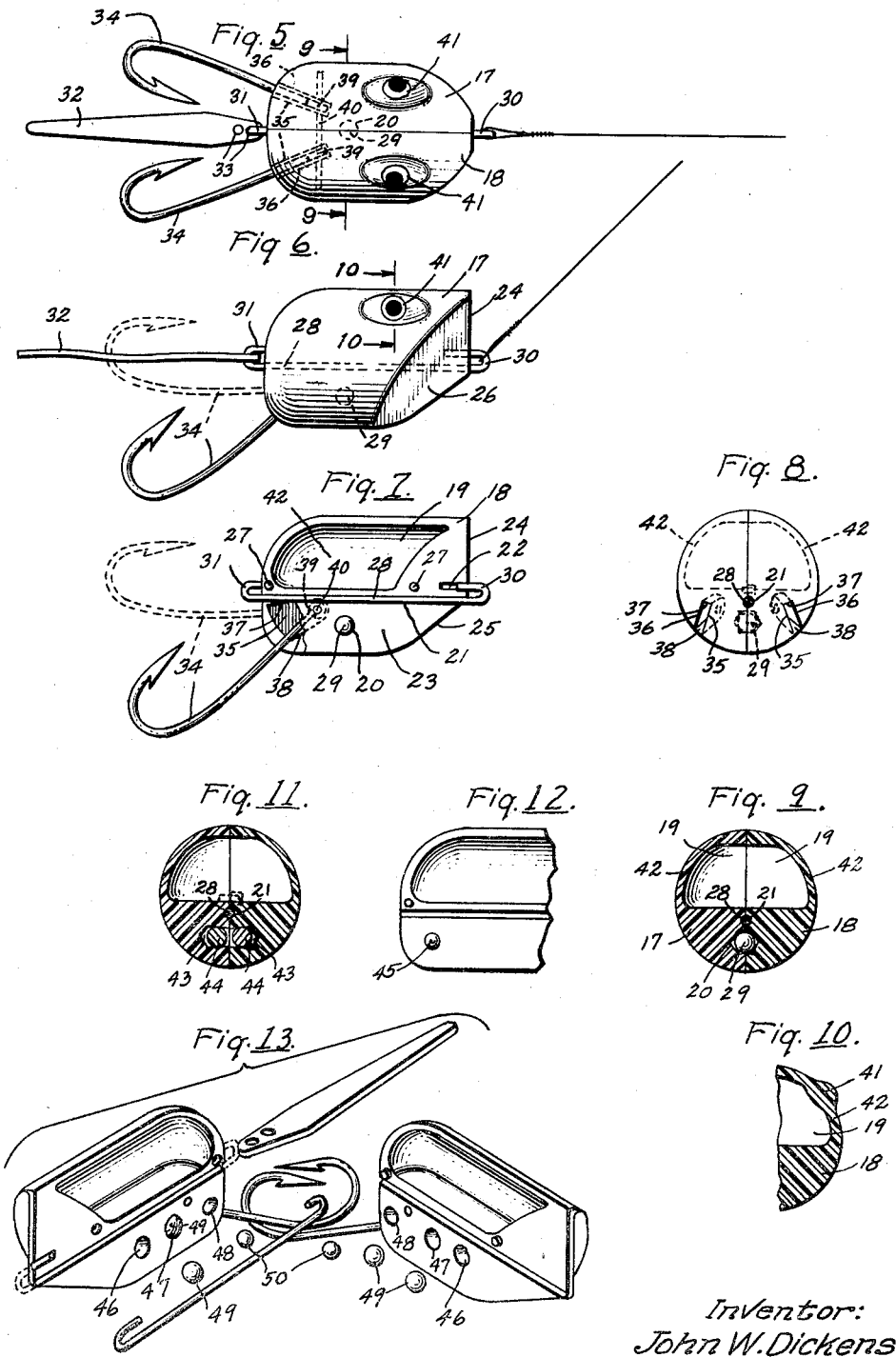
Inventor:
John W. Dickens,
by Charles S. Penfold
His Attorney.

2,932,113
FISH LURE

John W. Dickens, Fort Wayne, Ind.; George R. Gawehn executor of said John W. Dickens, deceased Application March 16, 1956, Serial No. 571,960

6 Claims. (Cl. 43—42.44)

This invention relates generally to fishing tackle and more particularly is directed to improvements in artificial baits or lures.

One of the important objects of the invention is to provide a lure embodying improved principles of design and construction.

A significant object of the invention is to provide a lure of the weedless type, having hooks thereon which may freely swing or pivot upwardly and inwardly to predetermined positions to the rear of the body of the lure when the lure is pulled through the water, and so that the body will aid in deflecting and preventing weeds from catching on the hooks. More specifically, the invention contemplates a setup whereby the hooks are carried by the body of the lure in such a manner that the hooks themselves primarily afford the means for keeping the hooks free of weeds. In other words, no additional or auxiliary members, such as springs or special guards, are required to protect the hooks from weeds or obstructions.

The swinging movement, above referred to, is preferably accomplished by providing the body of the lure with a tapered section forming corresponding cam surfaces against which the hooks may individually or jointly react.

Another object of the invention is to provide an arrangement of the character described which lends itself to use in surface or deep water lures.

A particular object of the invention is to provide a novel construction whereby the hooks are freely movable and can be actuated to simulate the legs or appendages of a live lure or thing, the actuation desired depending on the speed at which the lure is pulled through the water.

A further object of the invention is to provide a lure which is preferably weighted to some degree so that the lure will always fall in the water with its right side up when a cast is made. The weight is so located that it also assists in maintaining the lure more or less in a predetermined normal non-rotative position in the water so that it will act or function as intended.

A specific object is to provide the body of the lure with improved means at the front extremity of the body for stabilizing movement of the lure through water.

Another object of the invention is to provide a lure which is simple in design and construction, yet efficient in operation, and one that can be economically manufactured and assembled on a production basis.

Another object of the invention is to provide a modified form of lure body comprised of a pair of elongated substantially identical halves or sections which are preferably bonded together longitudinally by cement. More particularly in this regard, the sections are preferably moulded from a suitable plastic material and each section is preferably provided with a relatively large cavity in its upper portion, one or more pockets in its lower portion and a pair of longitudinally extending grooves located between the cavity and pocket. The organization is such that when the sections are assembled, the cavities form an air chamber, the pocket means for receiving weights and the groove seats for slidably receiving an axially extending member having means at its fore end for connection with a line and means at its rear end for supporting attraction means, such as a pork rind. The chamber serves to lighten the weight of the upper portion of the body so the lure will float and not roll appreciably when pulled through the water.

A specific but important object of the invention is to provide the rear end of each of the half sections with an angularly disposed elongated recess which receives the inner extremity of the shank of a hook having an eye thereon, with a pin extending through the eye for pivotally connecting the hook thereto for movement in a plane determined by the shape of the recess.

A further object of the invention is to provide each of the half sections with a configuration simulating an eye which is colored in an attractive manner.

Other attributes of the invention will become apparent when the description hereinafter set forth is considered in conjunction with the drawings annexed hereto.

In the drawings, wherein the preferred embodiment of invention is exemplified in a surface lure:

Figure 1 is a top view of the lure embodying the improved principles of design and construction;

Figure 2 is a side view in elevation of the lure shown in Figure 1;

Figure 3 is a longitudinal section taken substantially on the line 3—3 of Figure 2, the hooks and screws being omitted;

Figure 4 is a rear end view of the lure, the hooks being omitted;

Figure 5 is a top view of a modified form of lure embodying the invention;

Figure 6 is an elevational side view of the lure shown in Figure 5;

Figure 7 is an elevational view of one of the half sections of the lure body depicting the interior construction thereof;

Figure 8 is an elevational end view of the body with the attachable members removed therefrom;

Figure 9 is a vertical sectional view taken substantially on line 9—9 of Figure 5;

Figure 10 is a partial transverse sectional view taken substantially on line 10—10 of Figure 6;

Figure 11 is a vertical sectional view taken through a modified form of a lure body provided with pockets for receiving a pair of weights;

Figure 12 is a partial elevational view of a modified form of a half section of a lure body provided with a pocket for receiving a weight only at the rear end of the body; and Figure 13 is an exploded view exemplifying another modified form of lure body.

This application is a continuation-in-part of my co-pending application, Serial No. 286,313.

The body 1 of the lure, illustrated in Figures 1 through 4, may be designed and constructed of any material suitable for the purpose, but as herein illustrated the body is generally cylindrical in shape and constructed from wood.

The fore part or extremity of the body may be fashioned as desired but is preferably formed to provide a generally triangular rib portion 2 disposed in a vertical plane on the medial line of the body. The portion 2 is relatively thin, and includes a vertical leading edge portion 3 and an inclined lower edge portion 4. Means preferably in the form of a screw eye 5 is secured to the leading edge portion for attachment with a fish line. It will be noted that the screw eye is preferably secured to the portion 3 on the longitudinal axis of the body.

The body on opposite sides of the triangular rib portion 2 is preferably formed to provide corresponding inclined concave or dished surfaces 6 which serve to simultaneously force the lure upwardly and direct water upwardly and forwardly of the lure after the water is first more or less parted or divided by the rib portion. The rib portion and concave portions serve to produce sufficient agitation of the water to simulate, in some measure, some live thing struggling or swimming in the water whereby to afford an attraction for fish. Of further importance is the fact that the rib portion acts to stabilize movement of the lure through the water. More specifically, it tends to prevent, within practicable limits, rolling of the lure in the water and thereby acts to maintain the lure on an even keel or in a right side up position.

The body is also preferably provided with a small weight 7 set in the lower side of the body in a flush position. This weight also tends to maintain the lure in a normal or right side up non-rotative position when cast into the water.

A pair of hooks 8 having outer barbed extremities directed toward one another are pivotally connected to the lure by screws 9. Any kind of hooks suitable for the purpose may be utilized, but as herein shown, the hooks 8 are of the type commonly referred to as ringed sproat hooks.

The opposite sides of the rear rounded extremity of the lure body are preferably provided with elongated recesses which are angularly arranged so as to provide the body with a tapered section 10 forming corresponding cam surfaces 11. Each of the recesses includes a cam surface 11, a forward curved end wall 12 and generally parallel side walls 13 and 14. As exemplified by the projection lines in Figure 3 the cam surfaces 11 are arranged in a forwardly converging relationship and also in an upwardly converging relationship as illustrated by the projection lines in Figure 4. Thus, the forward and upper portions of the tapered section 10 are of a smaller cross-sectional dimension than the lower and rear portions of the section. It will be noted that the hooks are pivotally secured in the relatively deep forward extremities of the recesses so that the eyes of the hooks and pivot screws 9 are entirely disposed within the confines of the recesses. The relationship of the eyes of the hooks and screws 9 is such that twisting of the hooks is prevented. This factor, in combination with the coaction between the cam surfaces 11 and the shanks of the hooks, serves to produce the desired movements of the hooks when the lure is pulled through the water as described. With this arrangement, the eyes of the hooks and screws are fully protected from weeds and other obstructions. This allows the hooks to freely swing within a range preferably limited by the side walls of the recesses. More specifically, downward movement of the hooks is limited by the lower side walls 14, constituting stops or abutments, to normally maintain the hooks in the rearwardly inclined depending positions with the barbs located at the rear as shown in Figure 2. Upward movement of the hooks is limited by the upper side walls 13 constituting abutments so that the barbs of the hooks will preferably never take a position above the level of the upper surface of the lure body in order to prevent, within practicable limits, weeds or other obstructions from striking or catching onto the barbs whenever the hooks reach their uppermost positions. The hooks are restricted to free movement within their respective planes.

Attention is directed to the fact that when the hooks are in the full line positions shown in Figures 1 and 2 the outer extremities of the hooks are spaced considerably farther apart than when they are in their uppermost positions. The spread between the hooks is controlled by the cam means 11 and increases or decreases progressively as the hooks are raised and lowered.

In view of the foregoing, it will be manifest that when the lure is pulled slowly through the water the hooks will more or less assume their normal depending positions as shown in Figure 2. If the lure is intermittently jerked through the water, the hooks will swing rearwardly and forwardly to simulate the legs or appendages of a live creature, and irrespective of the speed at which the lure is pulled, the hooks are so freely movable that when they strike a weed or other obstruction they will swing upwardly and inwardly to the rear of the lure. In other words, any weeds, lily pads or other obstructions encountered will tend to swing one or the other or both hooks out of the way so they do not catch thereon.

Although not essential, a screw hook 15 may be secured to the center of the rounded rear extremity of the lure body to provide a support for a member such as a pork rind 16 to attract fish. The rind may be of any length and shape desired, but is preferably longer than the hooks and is tapered so as to simulate the tail of a live creature.

Referring now to the modified form of lure illustrated in Figures 5 through 10 of the drawing, the body of the lure is comprised of a pair of substantially identical elongated moulded semi-cylindrical half sections 17 and 18 constructed of some desirable plastic material. Each section is shell-like in character and, among other things, is provided with an elongated cavity 19 in its upper portion, a pocket 20 in its lower portion, and a pair of longitudinally extending parallel grooves 21 and 22 located between the cavity and pocket. Each section has a substantially inner planar side 23 and the cavity, pocket and grooves intersect this side as clearly shown in Figure 7. The forward extremity of each section is generally triangular in shape and provided with a vertical leading edge 24 and an inclined lower leading edge 25. The forward extremity of each section is also provided with a dished or concave portion 26 which flares into the vertical and inclined leading edges. The inner side 23 of each section is further provided with a pair of longitudinally spaced positioning means 27 preferably in the form of pins and holes which serve to position the sections in their proper relationship after cement is applied to the inner sides of the sections. The positioning means may be located where desired but as shown they are disposed adjacent the ends of the cavity and above the grooves.

When the sections are permanently secured together by cement so they form a cylindrical body, the cavities form an air tight chamber, the grooves form seats which receive a longitudinally slidable member 28 and the pocket means for receiving a weight 29 preferably in the form of a lead shot. The leading edges and the concave portions serve to part and deflect the water in the same manner as the corresponding portions on the lure first described.

The elongated slidable member 28 is mounted in the seats formed by the grooves 21 and 22 and its fore end is provided with a reversely bent portion or hook 30 slidable in the seat formed by the shorter grooves 22. The rear end of the member is similarly provided with a bent portion or hook 31. The arrangement is preferably such that the front hook has only a rounded exposed portion for connection with a line. In other words, the fore end of the slidable member is so formed and disposed that it will deflect weeds and other obstructions in the water.

The rear hook 31 serves as a support for attraction means, such as an elongated tapered strip of pork rind 32. The large end of the rind is preferably provided with a plurality of longitudinally spaced apertures 33. The rind can be readily connected to the rear hook by merely moving the slidable member rearwardly so that the hook can be threaded into either of the apertures 33, after which the member is moved forwardly to cause the end of the hook to engage the lure body and thereby secure the rind in a position between fish hooks 34 where it may trail, wiggle and quiver as the lure is retrieved. It will be noted that the rear hook 31 and its relationship with the body is preferably such that the hook and rind cannot catch on any weeds or other obstructions. It should be noted further that the rind is preferably somewhat longer than the exposed portions of the fish hooks and that the rear hook on the slidable member is disposed in a vertical plane in order that the plane of the rind will substantially take a horizontal position when the lure is pulled through the water.

The rear extremity of each body section is provided with an elongated angularly disposed recess substantially rectangular in cross-dimension. The recesses are open only at the rear of the body and the inner extremities of the fish hooks 34 are concealed for movement in the recesses. More specifically in this regard, each of the recesses, as clearly shown in Figures 5 and 7, includes a pair of opposed parallel flat surfaces 35 and 36, an upper surface 37 and a lower surface 38. The opposed pairs of surfaces 35 and 36 in the sections are disposed at angles substantially corresponding to the angle of the surfaces 11 on the tapered portion 10 of the lure first described to control movement of the fish hooks having outer barbed extremities directed toward one another and the upper and lower surfaces afford abutments limiting the extent of the pivotal movements of the hooks. It will thus be apparent that each section of the body is provided with a portion which overlies the surface 35 to conceal and protect the inner extremity of a fish hook so that the hook is freely pivotal.

The hooks have eyes 39 and a pin 40 is inserted into the eyes and through holes provided therefor in the sections for respectively pivotally connecting the hooks to the sections. The eyes prevent rotation of the hooks about the longitudinal axes of their shanks and thereby position the curved and barbed ends of the hooks in a predetermined operative relationship and so that the eyes are guided by the opposed parallel surfaces 35 and 36 of the recesses.

Another feature of the invention resides in providing each of the half sections with a configuration 41 formed in a thin wall portion 42 defining a part of the cavity in each section. The configuration is more or less oval in shape and made somewhat thicker than the wall portion 42 to reinforce the configuration to permit proper shaping thereof to simulate an eye which is colored in an attractive manner as illustrated in Figures 5, 6 and 10.

The modified form of lure body illustrated in Figure 11 comprises, among other things, a pair of half sections and each section is provided with a pocket 43 of a size to hold a weight 44, as distinguished from the setup above described which carries only a single weight 29. A pair of weights causes the lure to float at a slightly lower level than the embodiment of the invention illustrated in Figures 1 through 10.

As shown in Figure 12, provision is made for retaining a weight 45 only at the rear end of the body so as to slightly tilt the forward extremity of the body upwardly.

The modification exemplified in Figure 13 of the drawing discloses a lure of a somewhat greater length than the lure depicted in Figures 1 through 10 and the inner side of each section is provided with a longitudinal row of spaced pockets 46, 47 and 48 for receiving weights 49 and 50. It will be noted that the weights 49 are substantially identical and located adjacent the center of the lure body in the lower portions thereof and that the weights 50 are somewhat smaller than the weights 49 and disposed adjacent the rear extremity of the body to slightly tilt the same like the weight 45 above referred to.

In view of the foregoing it will be manifest that the lures exemplified embody improved principles of design and construction for controlling the movement of fish hooks in predetermined converging planes. More specifically, attention is directed to the important fact that means axially spaced with respect to the pivot means for the hooks serve to control the pivotal movement of the hooks in predetermined planes.

Having thus described my invention, it is obvious that various modifications may be made in the same without departing from the spirit of the invention; and, therefore, I do not wish to be understood as limiting myself to the exact forms, constructions, arrangements, and combinations of parts herein shown and described, except to the extent defined in the claims.

I claim:

1. A lure comprising a body structure having a fore end to which a line may be attached and also having a rear portion, said structure also having a pair of forwardly and upwardly extending converging surfaces, means disposed in opposed spaced relationship to said surfaces, and a pair of fish hooks having outer barbed extremities directed toward one another and also having inner ends pivotally connected to the structure so that portions of the hooks are respectively disposed between the surfaces and said last-mentioned means for guidance thereby in a manner whereby when the hooks are pivoted upwardly their barbed extremities will move toward one another to positions rearwardly of said rear portion.

2. The lure defined in claim 1, in which the body structure is provided with members and the inner ends of the hooks have eyes through which the members respectively extend to establish the pivotal connections between the hooks and the body structure, and the members are respectively provided with the means disposed in opposed spaced relationship to said surfaces.

3. The lure defined in claim 1, in which the sides of the body are provided with recesses having base walls which constitute the converging surfaces and side walls which constitute stops which may be engaged by the hooks for limiting their pivotal range of movement.

4. A lure comprising a body structure having a fore end to which a line may be attached and also having a rear portion, a pair of fish hooks having outer barbed extremities directed toward one another and also having inner ends pivotally connected to the structure, and means to guide the hooks in a manner whereby when they are pivoted upwardly their barbed extremities will move toward one another to positions rearwardly of said rear portion.

5. The lure defined in claim 4, in which the body structure is provided with a pair of angularly disposed recesses within which the inner ends of the hooks are disposed and opposed surfaces of each recess constitute the guide means for each hook.

6. The lure defined in claim 4, in which the body structure is provided with a pair of forwardly and upwardly converging recesses within which the inner ends of the hooks are disposed and opposed surfaces of each recess constitutes the guide means for each hook.

References Cited in the file of this patent

UNITED STATES PATENTS

| Number | Name | Date |
|---|---|---|
| 841,429 | Passage | Jan. 15, 1907 |
| 1,007,007 | Pflueger | Oct. 24, 1911 |
| 1,489,207 | Hall | Apr. 1, 1924 |
| 1,586,178 | Comstock | May 25, 1926 |
| 1,645,644 | Davenport | Oct. 18, 1927 |
| 1,727,936 | Pflueger | Sept. 10, 1929 |
| 2,006,604 | Post | July 2, 1935 |
| 2,036,954 | Murray | Apr. 7, 1936 |
| 2,047,768 | Christiansen | July 14, 1936 |
| 2,149,054 | Jones | Feb. 28, 1939 |